(12) United States Patent
Petrovykh et al.

(10) Patent No.: US 10,356,103 B2
(45) Date of Patent: *Jul. 16, 2019

(54) AUTHENTICATION SYSTEM AND METHOD BASED ON AUTHENTICATION ANNOTATIONS

(71) Applicant: Genesys Telecommunications Laboratories, Inc., Daly City, CA (US)

(72) Inventors: Yevgeniy Petrovykh, Walnut Creek, CA (US); Gisele Verrier, El Cerrito, CA (US); Linda Garcia, Richmond, CA (US); Herbert Willi Artur Ristock, Walnut Creek, CA (US)

(*) Notice: Subject to any disclaimer, the term of this patent is extended or adjusted under 35 U.S.C. 154(b) by 15 days.

This patent is subject to a terminal disclaimer.

(21) Appl. No.: 15/253,810

(22) Filed: Aug. 31, 2016

(65) Prior Publication Data
US 2018/0063134 A1    Mar. 1, 2018

(51) Int. Cl.
*H04L 29/06* (2006.01)
*G06F 21/62* (2013.01)

(52) U.S. Cl.
CPC ........ *H04L 63/102* (2013.01); *G06F 21/6245* (2013.01); *H04L 63/08* (2013.01)

(58) Field of Classification Search
CPC ... H04L 63/0876; H04L 63/10; H04L 63/102; H04L 63/08; G06F 21/6245
See application file for complete search history.

(56) References Cited

U.S. PATENT DOCUMENTS

| | | | |
|---|---|---|---|
| 2006/0282819 A1* | 12/2006 | Graham | G06F 17/241 717/113 |
| 2009/0099860 A1* | 4/2009 | Karabulut | G06F 21/604 705/325 |
| 2010/0011282 A1* | 1/2010 | Dollard | G06F 17/241 715/233 |
| 2010/0114563 A1 | 5/2010 | Choi et al. | |
| 2014/0136983 A1 | 5/2014 | Herold | |
| 2014/0137190 A1* | 5/2014 | Carey | H04L 63/1433 726/3 |
| 2014/0331299 A1 | 11/2014 | Junod et al. | |

(Continued)

OTHER PUBLICATIONS

Stephanie Chollet, "An Extensible Abstract Service Orchestration Framework," 2009 IEEE, pp. 831-838 (Year: 2009).*

(Continued)

*Primary Examiner* — Luu T Pham
*Assistant Examiner* — Canh Le

(57) ABSTRACT

A system and method for providing secure access to electronic records. A processor receives, from a first client, a first request to access the electronic records, authenticates the first client, and provides access to the electronic records in response to determining that the first client is authenticated. The processor receives user input data from the first client and stores the user input data in association with the electronic records. The processor further receives from a second client a second request to access the electronic records, retrieves the user input data associated with the electronic records in response to the second request, and transmits a prompt to the second client in response to the retrieved user input data. The processor also receives an answer to the prompt and provides access to the electronic records in response to the answer.

15 Claims, 12 Drawing Sheets

(56) References Cited

U.S. PATENT DOCUMENTS

| | | | |
|---|---|---|---|
| 2014/0372539 A1* | 12/2014 | Zaveri | H04L 51/046 709/206 |
| 2015/0271206 A1* | 9/2015 | Schultz | G06F 21/6236 726/3 |
| 2016/0219149 A1* | 7/2016 | Krishnan | H04M 3/5175 |
| 2017/0091469 A1* | 3/2017 | Leemet | G06F 21/6218 |
| 2017/0331824 A1* | 11/2017 | Pender | H04L 63/0892 |
| 2018/0026960 A1* | 1/2018 | Votaw | H04L 63/083 726/9 |
| 2018/0060871 A1 | 3/2018 | Petrovykh et al. | |

OTHER PUBLICATIONS

Maria Maleshkova, "Using Sematics for Automating the Authentication of Web API," 2010, pp. 534-549 (Year: 2010).*
International Search Report and Written Opinion for Application No. PCT/US2017/049554, dated Dec. 11, 2017, 23 pages.
Igor Faynberg et al., "On Dynamic Access Controls in Web 2.0 and Beyond: Trends and Technologies," *Bell Labs Technical Journal*, 16(2), pp. 199-218 (2011).

* cited by examiner

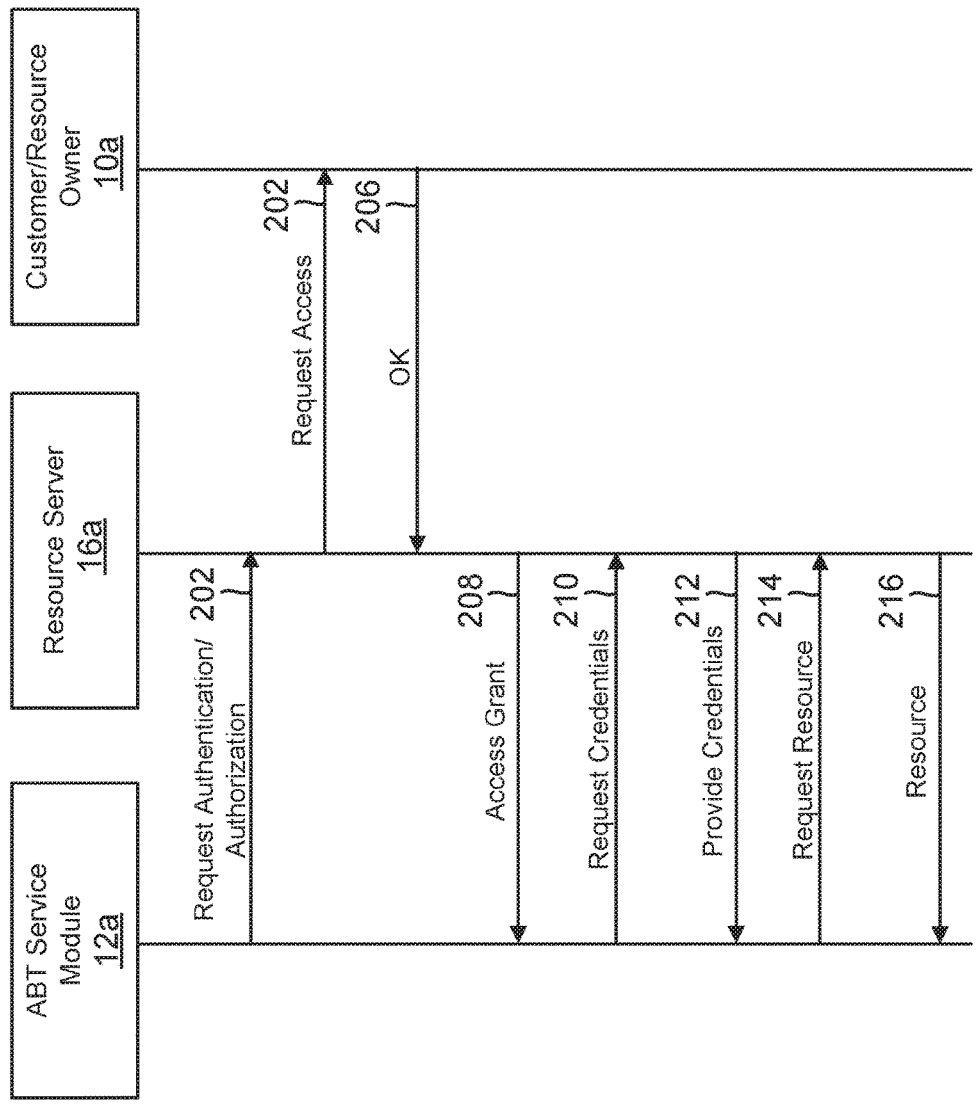

AUTHENTICATION SYSTEM AND METHOD BASED ON AUTHENTICATION ANNOTATIONS

CROSS-REFERENCE TO RELATED APPLICATIONS

This application is related to U.S. application entitled "System and Method for Providing Secure Access to Electronic Records," filed on even date herewith, the content of which is incorporated herein by reference.

BACKGROUND

Businesses often have information about customers that is not always accessible to such customers. If customers are allowed any access, it is often restricted to viewing the information. It may be desirable, however, to allow customers to access their user records, and make comments or annotations to their user records. For example, in the context of customer contact centers, enabling annotation for an ongoing interaction could help improve current or future service, and thus, help improve customer experience.

SUMMARY

The present invention is directed to a system and method for providing secure access to electronic records. In this regard, a processor receives, from a first client, a first request to access the electronic records, authenticates the first client, and provides access to the electronic records in response to determining that the first client is authenticated. The processor receives user input data from the first client and stores the user input data in association with the electronic records. The processor further receives from a second client a second request to access the electronic records, retrieves the user input data associated with the electronic records in response to the second request, and transmits a prompt to the second client in response to the retrieved user input data. The processor also receives an answer to the prompt and provides access to the electronic records in response to the answer.

According to one embodiment of the invention, the user input data includes information related to authenticating the second client, and/or additional security questions. For the additional security questions, the prompt to the second client is the additional security questions.

According to one embodiment of the invention, the second client is an application providing an interface for viewing and making modifications to the electronic records. In this regard, second user input data is received, the electronic records are updated based on the second user input data, and a trigger condition associated with the second user input data is monitored. A notification is transmitted in response to detecting the trigger condition. The trigger condition may be an interaction with a device associated with a particular business entity.

According to one embodiment of the invention, a command to cancel a pending transaction is received in response to the notification.

According to one embodiment of the invention, the second user input data identifies the particular business entity.

According to one embodiment of the invention, the second user input data is a list of items.

According to one embodiment of the invention, the trigger condition is receipt of first transaction details identifying a first item in the list of items, wherein the transmitting of the notification is in response to identifying that the first item is tagged in the list.

According to one embodiment of the invention, a command to cancel a pending transaction is received in response to the notification.

According to one embodiment of the invention, transaction details identifying a second item are received, and in response to determining that the second item appears in the list, a determination is made as to whether the second item is tagged in the list. In response to determining that the second item is untagged, the second item in the list is tagged.

According to one embodiment of the invention, a real-time interaction between a customer and a first agent of a contact center is identified, where the second user input data includes annotations by the customer during the real-time interaction. The annotations are parsed. According one embodiment, the trigger condition is detection of a key word or phrase, and the notification is a notification to a second agent of the contact center.

According to one embodiment of the invention, the notification is for escalating the handling of the interaction to the second agent.

According to one embodiment of the invention, the notification is a message associated with training of the first agent.

As a person of skill in the art should appreciate, embodiments of the present invention allow customers to access records that are maintained by a business to alter those records with annotations and further control access to those annotations. For example, the customer could mark the annotations to have the option to control access to his annotations as being accessible to self only, to certain other customers, and/or capable of being exposed to the business. Customers may also review and annotate data maintained at the business side on behalf of the customer for controlling privacy of the data, questioning relevance of the data, or the like. The annotations may also enable the customer to clarify requests, correct misunderstandings, or express sentiments during the call. This ability may be particularly important in our multilingual environment where verbal miscommunications are common. Even outside of the context of customer contact centers, the ability to annotate user data may help enhance satisfaction with the business as it may aid better communication between the business and its customers.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 2 is a messaging diagram for authorizing a client to access resources of a resource owner according to the embodiment of FIG. 1A.

DETAILED DESCRIPTION

Figure 1A:
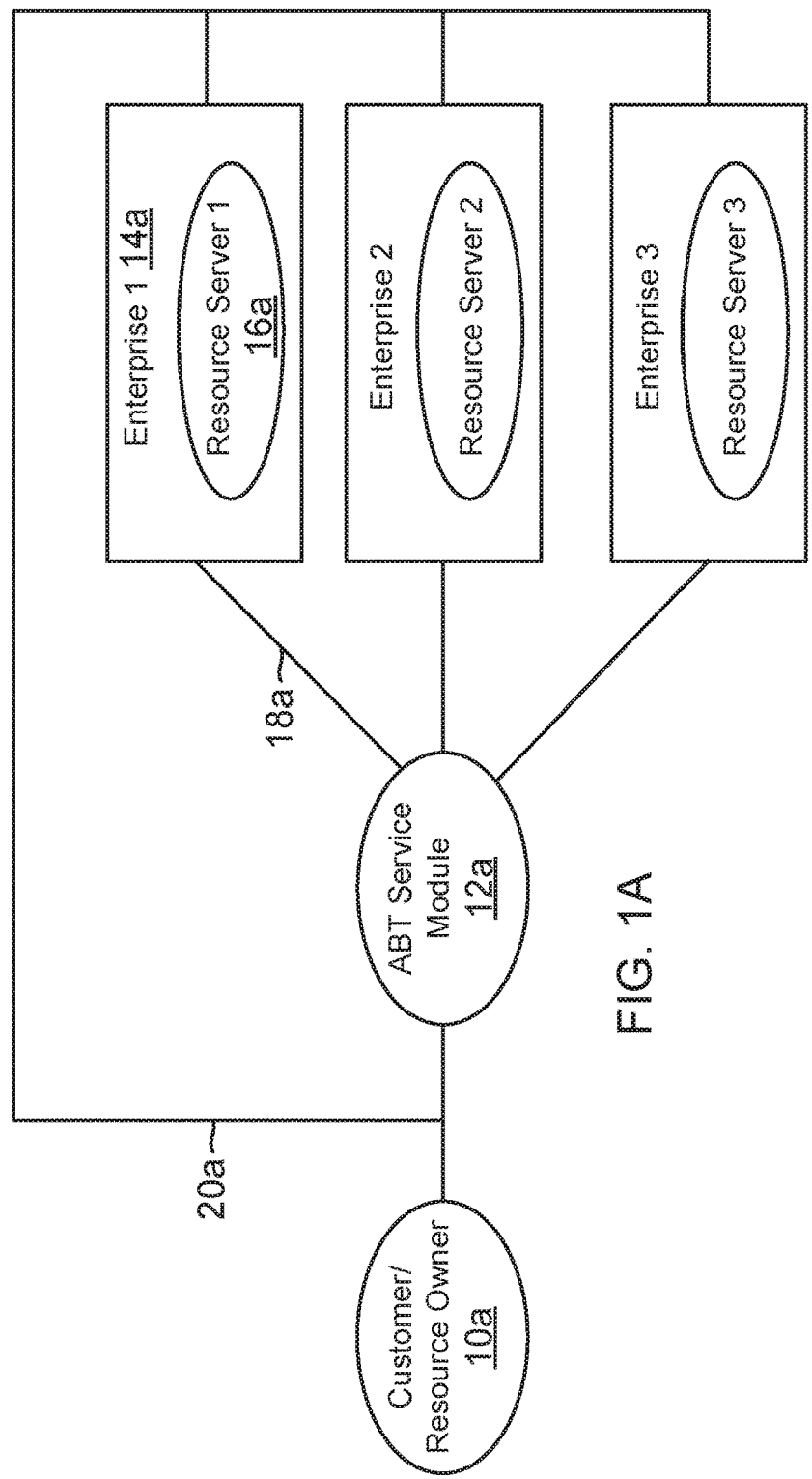
FIGS. 1A and 1B are schematic block diagrams of a system for providing ABT services according to various embodiments of the invention.

In general terms, embodiments of the present invention are directed to a system and method that provides secure access to electronic records that are maintained by a business with which a customer does business. The business may be, for example, a customer contact center, bank, or any other business known in the art. Upon secure access to the electronic records, embodiments of the present invention provide access to an annotated business transaction (ABT) service provided by, or on behalf of, the business. The service allows the customers to make annotations, notes, comments, and the like (collectively referred to as annotations). The annotations, or trigger conditions identified in response to processing the annotations, are monitored by servers maintained by the business, and notifications are transmitted, or actions are taken, in response to detecting the trigger conditions. In addition, embodiments of the present invention allow customers to control access to the annotations. For example, the annotations may be flagged to self only, shared with certain other customers, or exposed to the business. In addition, the access of customers to their own data maintained by a business may allow a customer to review and approve/disapprove keeping of certain data, or questioning relevance of the data. Customer may also control lifespan of an interaction through annotations.

Various representative use cases help illustrate the embodiments of the present invention. In a first use case, a customer might have a gift card for a particular retailer (such as Target, Best Buy, Walmart, VS, etc.), and may use a bank issued credit card for shopping. Through the bank's ABT service the customer may create a reminder about the gift card. The reminder may be activated the next time the credit card is used at the given retailer, for example, by displaying a respective message when the card is swiped, or by sending a message to the customer's smart phone, etc. The credit card transaction is paused to give the customer the opportunity to use the gift card, or to just continue the given transaction.

In a second use case, two customers might share the same bank account, and might be shopping at the same time. Through the bank's ABT service the customers may upload a joint shopping list, and each time the credit card is used for purchasing an item from the list, it is tagged accordingly. Prior to tagging, a mapping may need to be performed between an item on the list (which may be a generic item), and the specific item purchased at the store. When trying to purchase a tagged item, a message is shown, and the transaction is paused to give the customer the opportunity to either cancel the transaction or to continue.

A third use case relates to annotating interaction records generated from interactions between a customer and a customer contact center. The contact center may enable customers to annotate interaction records for both finished and unfinished interactions. The annotations provide the customer with the opportunity for explicit, real-time, feedback and comments about the interaction. Such annotation can go beyond satisfaction rating or customer sentiment. For example, the annotations may be a follow-up request on additional topics the customer forgot to ask, a best time to contact the customer, a customer's summary of the outcome of the interaction for validation by the enterprise, a reminder on topics to be addressed when an unfinished interaction is resumed, or correction to a misunderstood verbal communication. In addition, a customer may annotate the interaction record with lifespan information so that the unfinished interaction may be disregarded if not completed by certain date or time.

A fourth use case relates to authentication annotation. A customer may want to access a protected resource or service which requires authentication and authorization. The authentication service might be explicitly exposed to the customer, and the customer could create an annotation for use at the next authentication and access attempt for a particular resource or service. It could be just a reminder to be shown to the customer at the above trigger event, but it could be also a tuning request for the authentication, such as, for example, adjusting a time duration for the authentication, or performing additional authentication checks (e.g., asking for a secret). The authentication service may be for accessing a certain resource or service which is protected, for example, by an Open Authorization (OAuth) protocol which is well known in the art. The authentication and authorization service may be ABT enabled, and the owner of the resource may create an annotation that is triggered at the next authentication attempt for getting access to a particular resource or service.

Another use case may be in the field of medicine. For example, a patient may annotate his or her medical records with observations over an extended period of time, and review those observations with the doctor at a next doctor's visit. For example, a reliable diabetic patient might enter daily blood glucose readings into a structured form that is an extension of current glucose records from a laboratory, or a chronic pain patient may enter daily pain levels or triggering events. This could enable a physician to more easily see actionable trends. Additionally, a patient could make a notation of questions to ask the physician during an office visit—either new questions or follow-up questions to the doctor's notes from the prior visit. With prior knowledge of the questions, a physician may have more complete answers available, enhancing both patient satisfaction and patient care.

A further use case may relate to annotation of credit card purchases. For example, if a credit card is used for a business related expense, the purchase may be annotated with attendee name(s) and business purpose. A pop-up screen may be displayed on a customer device when the credit card is swiped to allow the customer to make such annotations. In the printed account statement version, a line item could have a note indicating that the purchase was annotated. The account holder or those they authorize to view/access the account may view the specific details of the note when accessing the credit card account online. A link to view to the purchase note may also be sent to an authorized user as soon as the annotation is created. Personal card purchases may also be annotated to identify, for example, those purchases that are tax deductible from those that are not tax deductible.

In another other use case, certain data maintained by a business may be annotated by the customer as relating to privacy of the customer. Such tagged data may then be considered by the company for purging. The customer may also review data about the customer generated by the company and annotate such data to question relevance, accuracy, or the like. According to one embodiment, in the event that the annotations relate to the customer complaining about the customer's data being captured by the business or accuracy/relevancy of the data, a manager/supervisor may be notified for follow-up action which may include, for example, a callback to the customer.

FIG. 1A is a schematic block diagram of a system for providing ABT services according to one embodiment of the invention. A customer 10a, also referred to as a resource owner, owns resources that are maintained by each enterprise 14a. The resources, which may also be referred to as user records, may, for example, be interaction records (e.g., providing information on interactions between the customer and agents of a customer contact center), transaction records (e.g., providing information on financial transactions by the customer using a card issued by a bank or credit card company), annotations made by the customers, and/or any other information pertaining to the customer and accessible upon a successful authentication and/or authorization for the information.

Each enterprise 14a may include a resource server 16a configured to facilitate secure access to each customer's resource. According to one embodiment, the resource server 16a may be configured to engage in authentication/authorization of users, entities, and/or applications (collectively referred to as clients) seeking to access the customer resources. The authentication/authorization of users may also be provided by a separate authorization server (not shown) which may or may not be hosted in a device physically separate from the resource server.

According to one embodiment of the invention, the enterprises 14a are coupled to an ABT service module 12a configured to provide ABT services to the customer 10a. The ABT services may include access to the customer records for viewing and/or editing, including the ability to view, edit, and generate customer annotations. ABT services may also include the ability to control access to the annotations as well as control over other data generated by the business for the customer. In this regard, the ABT service module 12a provides a user interface (e.g., a graphical user interface) that the user accesses to request access to the user records stored at the enterprise. The user interface may be used to generate the annotations and set access control to those annotations. The user interface may also be used to review data generated by the business of the customer, and approve and/or disapprove keeping of certain data by the business, or questioning the relevance of such data.

According to the embodiment of FIG. 1A, the ABT service module 12a is hosted in a server physically separate from servers of the various enterprises 14a, and may be controlled by an entity other that the enterprises. In this regard, the customer 10a may access a single interface provided by the ABT service module 12a to generate annotations for different resources of the customer stored at different enterprises. According to one embodiment, the ABT service module 12a communicates with the resource servers 16a of the various enterprises, over data communication links 18a. The data communication links 18a may traverse a local area network, private wide area network, and/or the public Internet. According to one embodiment, access to the user records may also be available over a data communication link 20 which may be similar to the data communication link 18a. The latter access may be via interface mechanisms provided by the enterprise's resource server 16a.

The annotations generated by the customer via the ABT service module 12a may be structured data, unstructured data, or a combination of both. Structured data may be a result, for example, of entering annotations into preset fields provided by the user interface that is invoked by the customer to generate annotations. Structured data may also be generated by associating metadata or other tags, to the text. Unstructured data may be the result of entering annotations in free-text form. In either case, the generated annotations may become a resource of the customer that is saved at the corresponding enterprise 14a, and controlled by the corresponding resource server 16a. According to one embodiment, the annotations may be appended to other user records. According to one embodiment, the user annotations may be time-stamped with a date and/or time of creation, and in some embodiments, may be configured to be deleted upon expiration of a certain time period or satisfaction or a preset condition.

In the various embodiments, the customer generating the annotations may control access to the annotations via flags that indicate that the annotations may be exposed only to the customer, certain other customers, and/or the business.

Figure 1B:
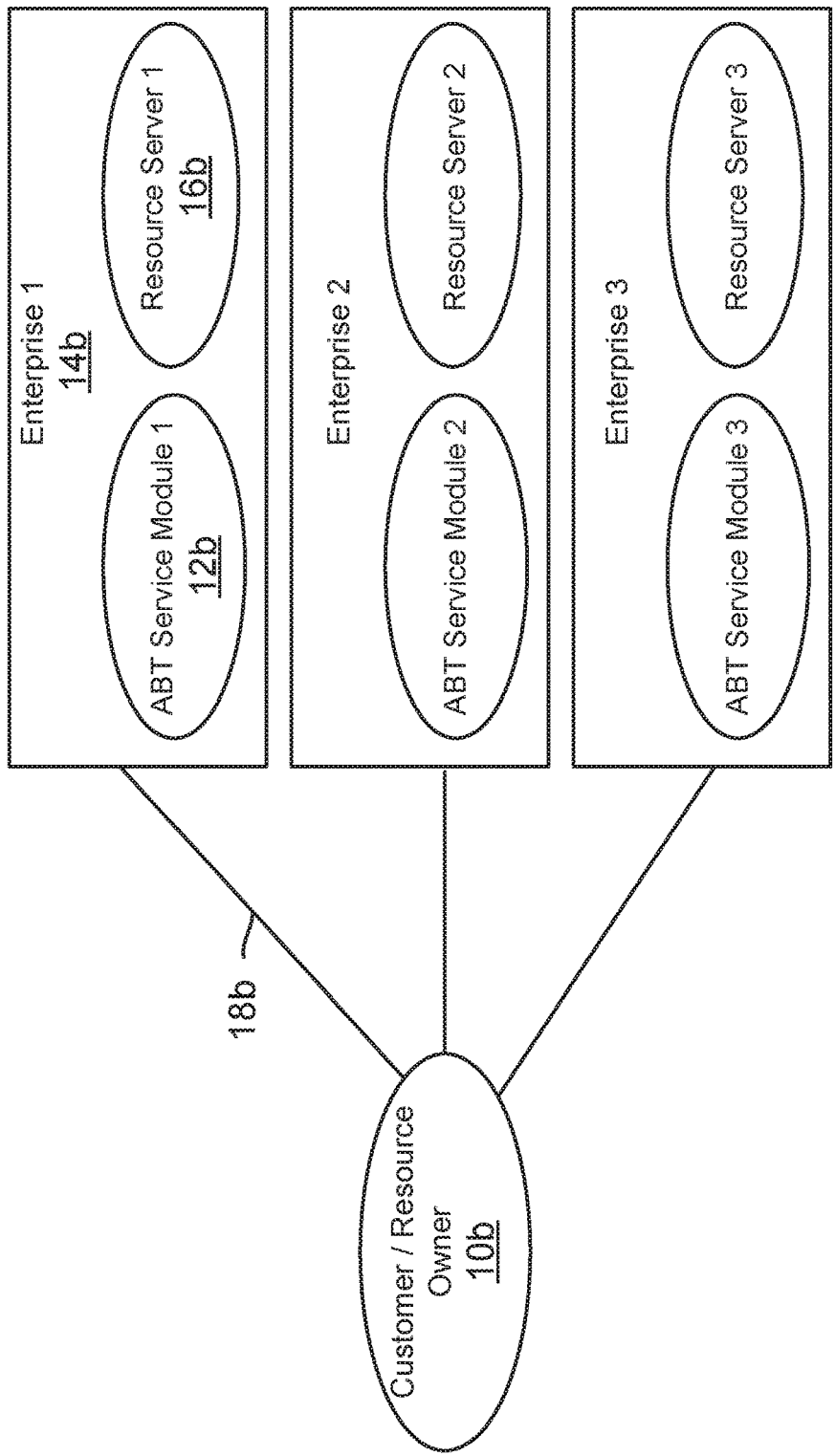

FIG. 1B is a schematic block diagram of a system for providing ABT services according to another embodiment of the invention. According to this embodiment, the customer 10b, which may be similar to the customer 10a, accesses an ABT service module 12b to securely access the customer's resources and make annotations. The ABT service module 12b may be similar to the ABT service module 12a of FIG. 1A, except that instead of being hosted in a server physically separate from the servers of the various enterprises, a separate ABT service module 12b is hosted in a server of the corresponding enterprise 14b. For example, a separate ABT service module 12b may be hosted in conjunction with each resource server 16b. In this regard, each enterprise may provide a separate ABT service catered to the needs of the enterprise. Also, in the embodiment of FIG. 1B, the authorization/authentication of users may be performed by either the ABT service module 12b or resource server 16b.

FIG. 2 is a messaging diagram for authorizing the ABT service module 12a (also referred to as a client), to access resources of the customer 10a, according to the embodiment of FIG. 1A. The authorization process may begin in response to a request, by the customer 10a, to invoke ABT services of the enterprise 14a. Prompted by the request, the ABT service module 12a transmits, in act 202, a request to access the user records. The request is directed to the resource server 16a of the appropriate enterprise.

In act 204, the resource server 16a requests authorization from the customer/resource owner 10a. Whether the request is authorized or not may be preconfigured by the resource owner or decided on the fly. For example, the customer may set permissions for another customer, the contact center, or a particular group.

If there is a request from another party which isn't preconfigured it could be sent to the customer, or denied (e.g., timeout if customer doesn't answer).

In response to the request, the customer 10a is authenticated, for example, by prompting and receiving the customer's password. According to one embodiment, the authentication of the customer 10a provides authorization, in act 206, to the ABT service module 12a to access the user records.

In act 208, the resource server 16a provides an access grant message to the ABT service module 12a.

In act 210, the ABT service module transmits a request for credentials to the resource server 16a, and the credentials are provided to the ABT service module 12a in act 212. According to one embodiment, the credentials, which may take the form of a digital token, secret, and/or the like, acts as a ticket for future access to the customer's resource.

In act 214, the ABT service module 12a transmits a request for the resource, along with the credentials, and the server provides the resource in act 216.

Of course, a person of skill in the art should recognize that there are other mechanisms for authorizing the ABT service module 12a to access and annotate user records maintained for a user at a particular enterprise which will be evident to a person of skill in the art.

Once the ABT service module 12a is authorized and has access to the user records, the ABT service module may update the user records with, for example, user annotations.

Any authentication/authorization of users according to the embodiment of FIG. 1B may be more simplistic given that the enterprise hosts both the ABT service module 12b and resource server 16b. Accordingly, the extra security measures taken to ensure that the ABT service module 12b is in fact authorized to access and modify user records, may be eliminated.

Figure 3:
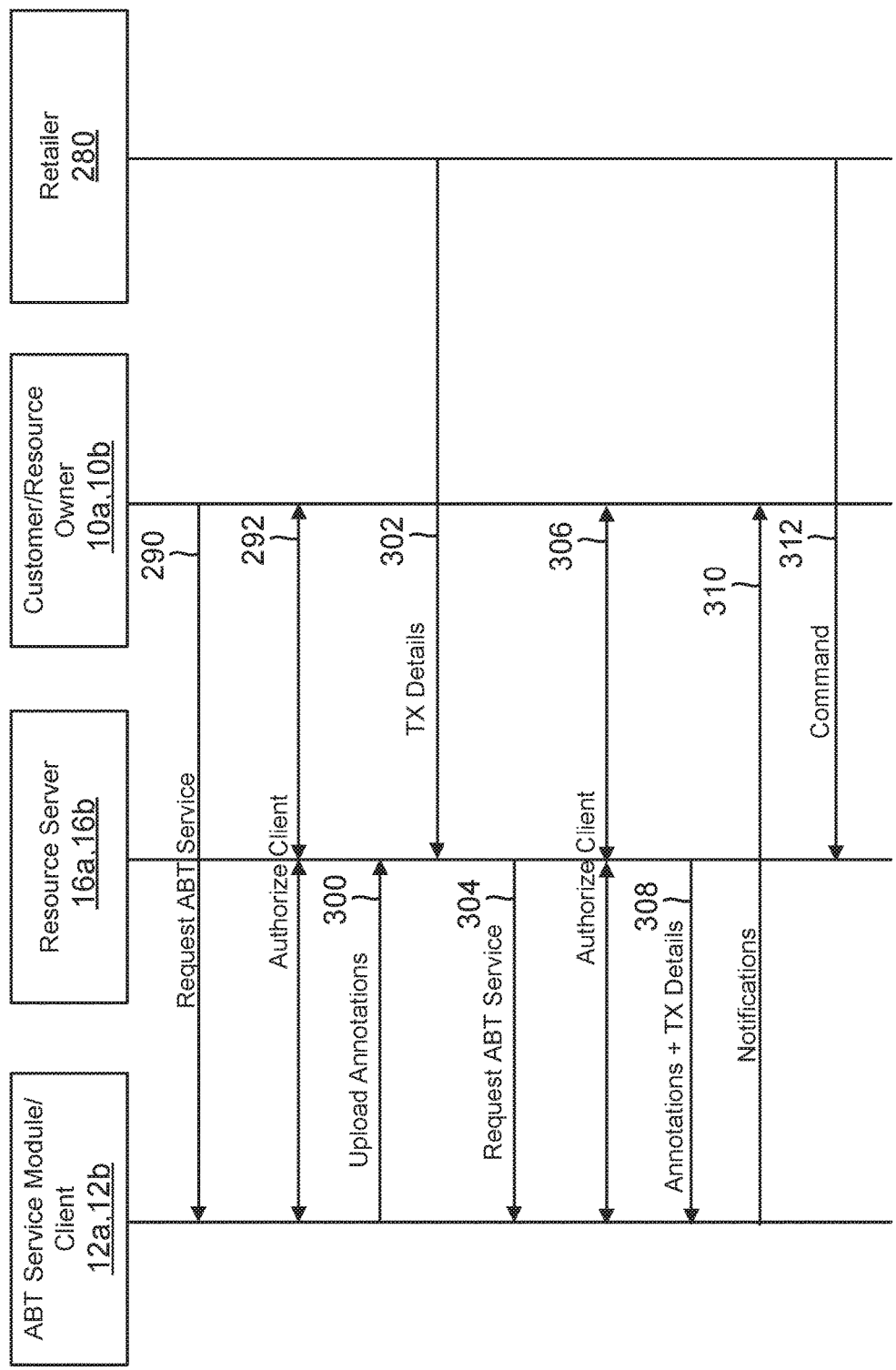
FIGS. 3 and 4 are messaging diagrams of messages transmitted by the various components of the system in FIG. 1A or 1B, for providing ABT services according to various embodiments of the invention.

FIG. 3 is a messaging diagram of messages transmitted by the various components of the system in FIG. 1A or 1B, for providing ABT services to the customer 10a, 10b (collectively 10) according to one embodiment of the invention. In one use case of this embodiment, a customer can include as annotations, gift cards that he or she has for particular retailers. If a purchase is attempted in one of the retailers using a bank or credit card, a notification is sent so as to allow the customer to cancel the transaction and use the gift card.

In act 290, the customer 10 transmits a request for ABT service in act 290. In this regard, the customer may invoke a web browser to access a web page provided by the ABT service module 12a, 12b (collectively 12). In some embodiments, the customer's user device (e.g., smart phone, desktop, etc.) may have an application installed therein that provides a graphical user interface for submitting ABT service requests to the ABT service module 12. According to one embodiment, the request identifies the enterprise 14a, 14b (collectively 14) and/or resource server 16a, 16b (collectively 16) that stores the user records to be accessed by the customer.

According to one embodiment, the request for ABT service is for viewing, generating, and/or modifying annotations maintained by the enterprise 14 in user records. Such user records are private and should be accessed by the user upon his or her authentication, or accessed by those authorized by the user. In this regard, the ABT service module 12 is given, in act 292, authorization to access the user records. According to one embodiment, the authorization is done according to the process described with respect to FIG. 2. However, in the embodiment where the ABT service module 12 and resource server 16 are hosted in a single computing device, as in the embodiment of FIG. 1B, a mechanism that simply invokes authentication of the customer 10 may be employed.

In act 300, the ABT service module 12 uploads annotations generated by the customer. The annotations may be, for example, reminders or notifications that the customer may want to receive in response to detecting a trigger condition. In the embodiment of FIG. 3, it is assumed that the annotations identify a gift card, credit, or coupon for a particular business entity. Other details may also accompany the annotation, such as date in which the gift card, credit, or coupon was received, dollar amount, and/or expiration date.

According to one embodiment, upon receipt of the annotations by the resource server 16, the annotations are stored in the user record maintained by such server. The resource server may be configured identify an identification code for the particular business entity, and store the code in association with the annotation.

In addition to annotations, the resource server 16 may be configured to store and manage other data for the customer 10. Such data may be reviewable by the customer, and annotations may be generated for the data. For example, if the resource server 16 is one associated with a bank or credit card company, the resource server may be configured to store and manage bank or credit card transaction information for the customer. In this regard, in act 302, the resource server 16 receives transaction details of a transaction using a credit or debit card issued by the bank or credit card company. The transaction details may, in one embodiment, identify a retailer 280 where the card was used, an amount of the associated transaction, and a credit/debit card number. In the case where multiple cards are issued with the same credit card number, identification of the specific person using the credit card may also be transmitted as part of the transaction details. Identification of the person may help prevent potential unauthorized use of the credit card.

The transaction details may be provided by a device hosted by the retailer, such as, for example, a credit card reader or other point of sale terminal. According to one embodiment, the transaction details may include an identifier of the point of sale terminal which may be used to identify the retailer transmitting the transaction information.

Upon receipt of the transaction details, the resource server 16 is configured to determine whether annotations exist for the customer associated with the credit/debit card number. If such annotations exist, the resource server transmits a request for ABT service in act 304. The request may prompt the ABT service module 12 to seek, in act 306, authorization to access the user records and pending transaction details. According to one embodiment, the authorization is done according to the process described with respect to FIG. 2. Such authorization step may be omitted in the embodiment where the ABT service module 12 and resource server 16 reside in a single computing device.

Upon authorization of the ABT service module 12, the resource server 16 transmits, in act 308, the user records containing user annotations as well as the details of pending transactions that are awaiting completion. According to one embodiment, the module 12 compares the user annotations against the transaction details for a trigger condition. The trigger condition may be, for example, determining that the retailer 280 transmitting the transaction details, is a retailer mentioned in the user's annotations. For example, the user's annotations may identify that the customer has a gift card to the retailer. Upon detecting that the pending transaction is from the retailer with which the customer (or another person authorized to use the credit card) has a gift card, the ABT service module 12 may be configured to transmit, in act 310, a notification or alert to the customer 10. In some embodiments, the notification may be transmitted to the resource server 16 which in turn may forward the notification to the retailer 280 for display on a display device (e.g., a point of sale device). The notification may include all or portion of details in the customer annotation with respect to the particular retailer.

The customer receiving the notification may decide to cancel the pending transaction so that he or she can use the gift card instead of the credit/debit card. In this case, the retailer transmits, in act 302, a command to cancel the current pending transaction.

Figure 4:
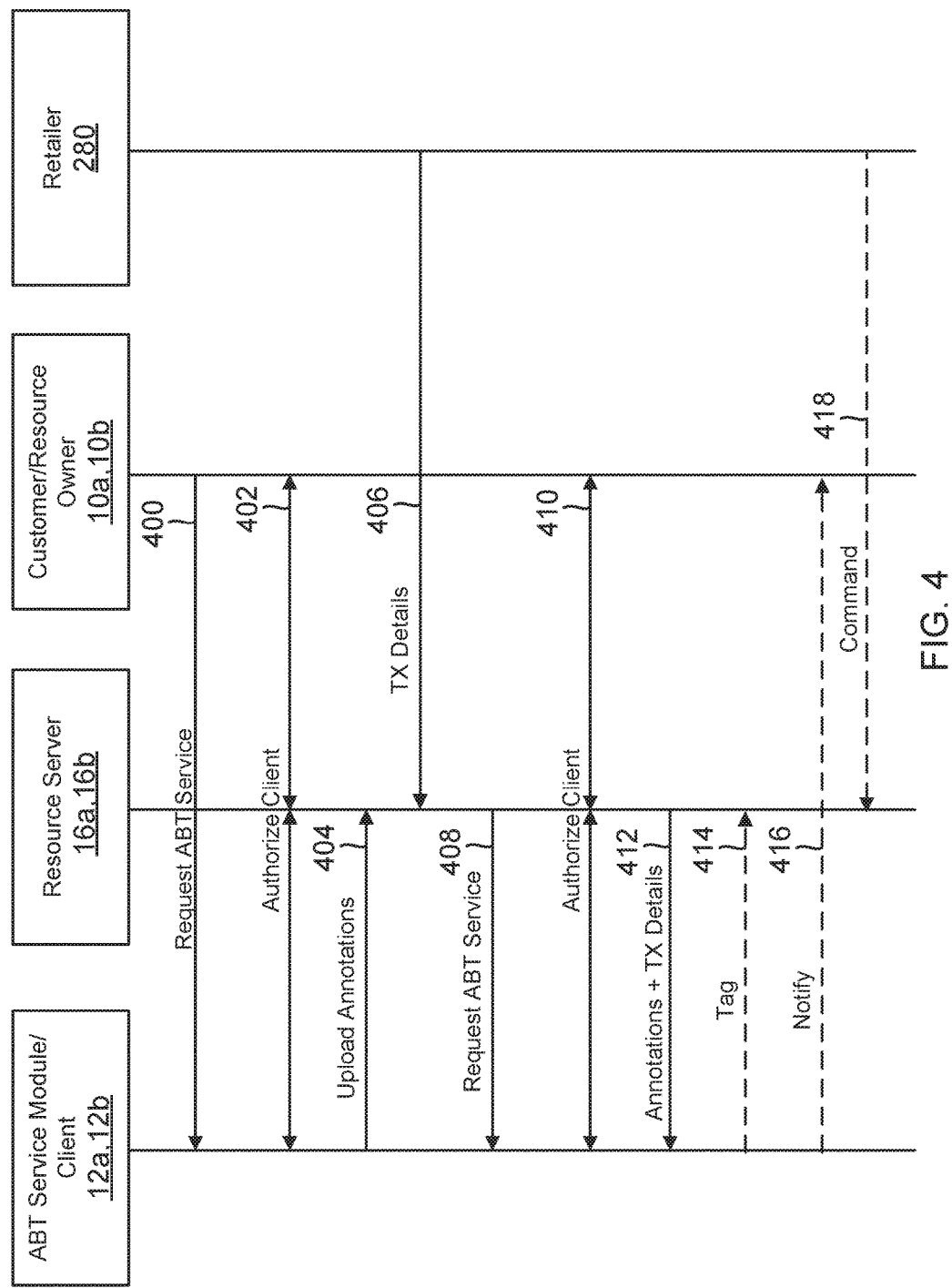

FIG. 4 is a messaging diagram of messages transmitted by the various components of the system in FIG. 1A or 1B, for providing ABT services to the customer 10*a*, 10*b* (collectively 10) according to another embodiment of the invention. In one use case of this embodiment, multiple customers have access to a shopping list maintained as annotations by the resource server 16. Items that are purchased by one of the customers are tagged in the list, and alert is transmitted if another one of the customers attempts purchase the tagged items.

In the embodiment of FIG. 4, the acts of requesting ABT service 400 and authorizing the client 402 are similar to acts 290 and 292 of FIG. 3, respectively.

In act 404, the ABT service module 12 uploads annotations generated by the customer. The annotations, according to the embodiment of FIG. 4, is a list of items (e.g., shopping list) created by the customer 10. According to one embodiment, the annotations may be generated by multiple customers in collaboration with each other. The multiple customers may be, for example, a husband and wife sharing a joint credit card or bank account. In this case, the resource server 16 maintains a user record for the joint account for access by the multiple customers.

Upon receipt of the annotations by the resource server 16, the annotations are stored in a user record maintained by such server. According to one embodiment, the ABT service module 12 or resource server 16 may be configured to map each item in the list, to a product code such as, for example, a Universal Product Code (UPC) number, and store the UPC in the customer record in addition to the annotations. As in the embodiment of FIG. 3, the resource server 16 may be associated with a bank or credit card company for storing and managing data related to bank and/or credit card transactions in addition to user generated annotations. In this regard, in act 406, the resource server 16 receives transaction details of a transaction using a credit or debit card issued by the bank or credit card company. The transaction details may, in one embodiment, identify a retailer 280 where the card was used, a credit/debit card number used at the retailer, and a list of items in the transaction.

Upon receipt of the transaction details, the resource server 16 is configured to determine whether annotations exist for the customer associated with the credit/debit card number. If such annotations exist, the resource server transmits a request for ABT service in act 408. The request may prompt the ABT service module 12 to seek, in act 410, authorization to access the user records and pending transaction details.

Upon authorization of the ABT service module 12, the resource server 16 transmits, in act 412, the user records containing user annotations as well as the details of pending transactions that are awaiting completion. According to one embodiment, the module 12 compares the user annotations against the transaction details for a trigger condition. The trigger condition may be, for example, identifying an item listed in the transaction details, which also appears in the item list included in the annotations. The identification may be, for example, by comparing UPC numbers of the items in the pending transaction, with the UPC numbers associated with the list of items included in the annotations. If there is a match of UPC numbers, the ABT service module 12 determines whether the item appearing in the annotations is tagged as already having been purchased. If the answer is NO, the ABT service module 12 transmits a command to the resource server 16, in act 414, to tag the item appearing in the annotations. The tag may identify, for example, that the item is being purchased by the current customer.

If, however, the item appearing in the annotations is tagged as already having been purchased, the ABT service module 12 transmits a notification or alert to the customer 10 in act 416. The notification may include, for example, identification of the item that is marked in the customer annotations as having been purchased. The customer receiving the notification may decide to cancel the pending transaction in order to remove the item from the current transaction. In this case, the retailer transmits, in act 418, a command which may be to cancel the current pending transaction and replace with a new transaction that has the identified item removed.

In some embodiments, ABT services may also be provided to customers of a customer contact center. In one use case, a customer may invoke the ABT services to generate annotations during an interaction with a resource of the contact center. According to one embodiment, the access to the record by different parties (e.g., customer and agent) is sequential and not concurrent. The annotations may be used, for example, to escalate the handling of the interaction to a supervisor, or for agent training purposes. The annotations may also be used to remind the customer of issues that may not have been handled during a past interaction that should be mentioned during a current interaction.

Figure 5:
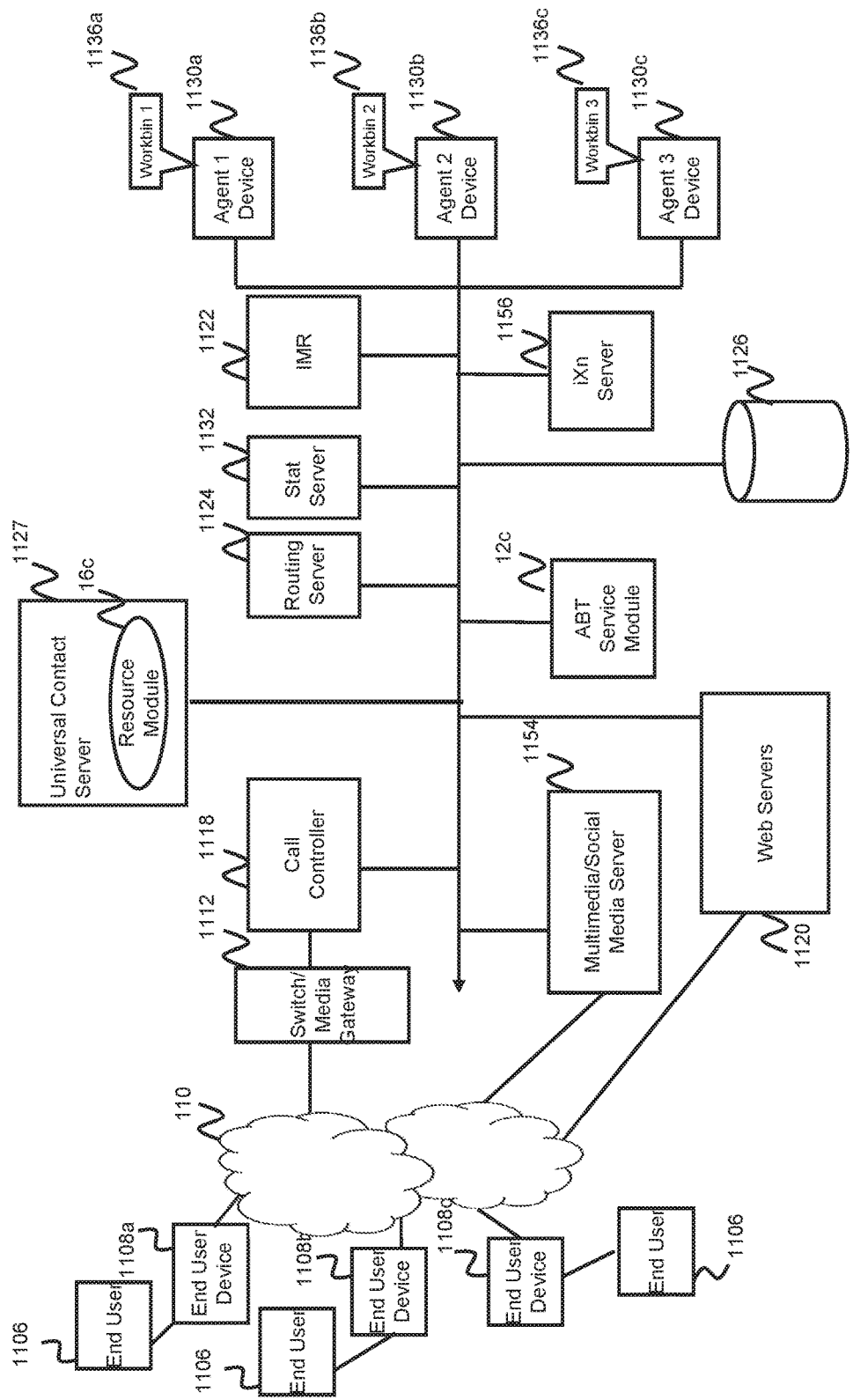
FIG. 5 is a schematic block diagram of a system for supporting a contact center in providing contact center services according to one exemplary embodiment of the invention.

FIG. 5 is a schematic block diagram of a system for supporting a contact center in providing contact center services according to one exemplary embodiment of the invention. The contact center may be an in-house facility to a business or enterprise (e.g., enterprise 14) for serving the enterprise in performing the functions of sales and service relative to the products and services available through the enterprise. In another aspect, the contact center may be operated by a third-party service provider. According to some embodiments, the contact center may operate as a hybrid system in which some components of the contact center system are hosted at the contact center premise and other components are hosted remotely (e.g., in a cloud-based environment). The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center system may also be distributed across various geographic locations and computing environments and not necessarily contained in a single location, computing environment, or even computing device.

According to one example embodiment, the contact center system manages resources (e.g., personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers or end users, e.g., end users 106 which may be similar to the customers 10 of FIG. 1) desiring to receive services from the contact center may initiate inbound communications (e.g., telephony calls) to the contact center via their end user devices 1108a-1108c (collectively referenced as 1108). Each of the end user devices 1108 may be a communication device conventional in the art, such as, for example, a telephone, wireless phone, smart phone, personal computer, electronic tablet, and/or the like. Users operating the end user devices 1108 may initiate, manage, and respond to telephone calls, emails, chats, text messaging, web-browsing sessions, and other multi-media transactions.

Inbound and outbound communications from and to the end user devices 1108 may traverse a telephone, cellular, and/or data communication network 1110 depending on the type of device that is being used. For example, the communications network 1110 may include a private or public switched telephone network (PSTN), local area network (LAN), private wide area network (WAN), and/or public wide area network such as, for example, the Internet. The communications network 1110 may also include a wireless carrier network including a code division multiple access (CDMA) network, global system for mobile communications (GSM) network, or any wireless network/technology conventional in the art, including but to limited to 3G, 4G, LTE, and the like.

According to one example embodiment, the contact center system includes a switch/media gateway 1112 coupled to the communications network 1110 for receiving and transmitting telephony calls between end users and the contact center. The switch/media gateway 1112 may include a telephony switch or communication switch configured to function as a central switch for agent level routing within the center. The switch may be a hardware switching system or a soft switch implemented via software. For example, the switch 1112 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, an agent telephony or communication device. In this example, the switch/media gateway establishes a voice path/connection (not shown) between the calling customer and the agent telephony device, by establishing, for example, a connection between the customer's telephony device and the agent telephony device.

According to one exemplary embodiment of the invention, the switch is coupled to a call controller 1118 which may, for example, serve as an adapter or interface between the switch and the remainder of the routing, monitoring, and other communication-handling components of the contact center.

The call controller 1118 may be configured to process PSTN calls, VoIP calls, and the like. For example, the call controller 1118 may be configured with computer-telephony integration (CTI) software for interfacing with the switch/media gateway and contact center equipment. In one embodiment, the call controller 1118 may include a session initiation protocol (SIP) server for processing SIP calls. According to some exemplary embodiments, the call controller 1118 may, for example, extract data about the customer interaction such as the caller's telephone number, often known as the automatic number identification (ANI) number, or the customer's internet protocol (IP) address, or email address, and communicate with other CC components in processing the interaction.

According to one exemplary embodiment of the invention, the system further includes an interactive media response (IMR) server 1122, which may also be referred to as a self-help system, virtual assistant, or the like. The IMR server 1122 may be similar to an interactive voice response (IVR) server, except that the IMR server 1122 is not restricted to voice, but may cover a variety of media channels including voice. Taking voice as an example, however, the IMR server 1122 may be configured with an IMR script for querying customers on their needs. For example, a contact center for a bank may tell customers, via the IMR script, to "press 1" if they wish to get an account balance. If this is the case, through continued interaction with the IMR server 1122, customers may complete service without needing to speak with an agent. The IMR server 1122 may also ask an open ended question such as, for example, "How can I help you?" and the customer may speak or otherwise enter a reason for contacting the contact center. The customer's response may then be used by a routing server 1124 to route the call or communication to an appropriate contact center resource.

If the communication is to be routed to an agent, the communication server 1122 interacts with the routing server (also referred to as an orchestration server) 1124 to find an appropriate agent for processing the interaction. The selection of an appropriate agent for routing an inbound interaction may be based, for example, on a routing strategy employed by the routing server 1124, and further based on information about agent availability, skills, and other routing parameters provided, for example, by a statistics server 1132.

In some embodiments, the routing server 1124 may query a customer database, which stores information about existing clients, such as contact information, service level agreement (SLA) requirements, nature of previous customer contacts and actions taken by contact center to resolve any customer issues, and the like. The database may be, for example, Cassandra or any NoSQL database, and may be stored in a mass storage device 1126. The database may also be a SQL database and may be managed by any database management system such as, for example, Oracle, IBM DB2, Microsoft SQL server, Microsoft Access, PostgreSQL, MySQL, FoxPro, and SQLite. The routing server 1124 may query the customer information from the customer database via an ANI or any other information collected by the IMR server 1122.

Once an appropriate agent is identified as being available to handle a communication, a connection may be made between the customer and an agent device 1130a-1130c (collectively referenced as 1130) of the identified agent. Collected information about the customer and/or the customer's historical information may also be provided to the agent device for aiding the agent in better servicing the communication. In this regard, each agent device 1130 may include a telephone adapted for regular telephone calls, VoIP calls, and the like. The agent device 1130 may also include a computer for communicating with one or more servers of the contact center and performing data processing associated with contact center operations, and for interfacing with customers via voice and other multimedia communication mechanisms.

The contact center system may also include a multimedia/social media server 1154 for engaging in media interactions other than voice interactions with the end user devices 1108 and/or web servers 1120. The media interactions may be related, for example, to email, vmail (voice mail through email), chat, video, text-messaging, web, social media, co-browsing, and the like. In this regard, the multimedia/social media server 1154 may take the form of any IP router conventional in the art with specialized hardware and software for receiving, processing, and forwarding multi-media events.

The web servers 1120 may include, for example, social interaction site hosts for a variety of known social interaction sites to which an end user may subscribe, such as, for example, Facebook, Twitter, and the like. In this regard, although in the embodiment of FIG. 1 the web servers 1120 are depicted as being part of the contact center system, the web servers may also be provided by third parties and/or maintained outside of the contact center premise. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an interaction (iXn) server 1156 interacts with the routing server 1124 for selecting an appropriate agent to handle the activity. Once assigned to an agent, an activity may be pushed to the agent, or may appear in the agent's workbin 1136a-1136c (collectively referenced as 1136) as a task to be completed by the agent. The agent's workbin may be implemented via any data structure conventional in the art, such as, for example, a linked list, array, and/or the like. The workbin 1136 may be maintained, for example, in buffer memory of each agent device 1130.

According to one exemplary embodiment of the invention, the mass storage device(s) 1126 may store one or more databases relating to agent data (e.g., agent profiles, schedules, etc.), customer data (e.g., customer profiles), interaction data (e.g., details of each interaction with a customer, including reason for the interaction, disposition data, time on hold, handle time, etc.), and the like. According to one embodiment, some of the data (e.g., customer profile data) may be maintained in a customer relations management (CRM) database hosted in the mass storage device 1126 or elsewhere. The mass storage device may take form of a hard disk or disk array as is conventional in the art.

According to some embodiments, the contact center system may include a universal contact server (UCS) 1127, configured to retrieve information stored in the CRM database and direct information to be stored in the CRM database. The UCS 1127 may also be configured to facilitate maintaining a history of customers' preferences and interaction history, and to capture and store data regarding comments from agents, customer communication history, and the like.

According to one embodiment, the UCS 1127 may host a resource module 16c which may be similar to the resource server 16b of FIG. 1B. In this regard, the resource module 16c is configured to interface with the ABT service module 12c to provide to a customer access to the customer's records stored in the CRM database. The ABT service module 12c may be similar to the ABT service module 12b of FIG. 1B.

The various servers of FIG. 1 may each include one or more processors executing computer program instructions and interacting with other system components for performing the various functionalities described herein. The computer program instructions are stored in a memory implemented using a standard memory device, such as random access memory (RAM). The computer program instructions may also be stored in other non-transitory computer readable media such as a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the terms "interaction" and "communication" are used interchangeably, and generally refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g., WebRTC calls), and the like.

Figure 6:
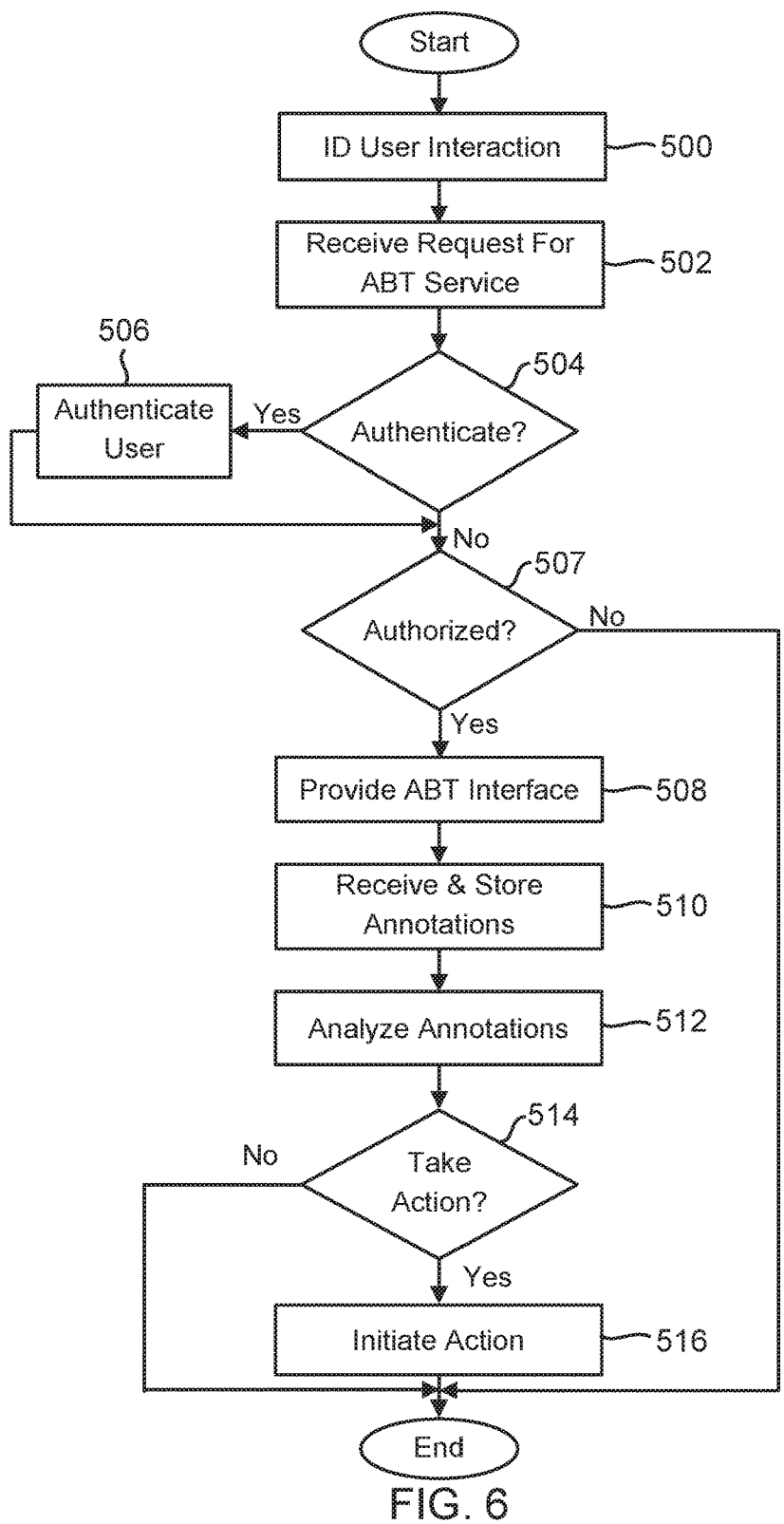
FIG. 6 is a flow diagram of a process for providing ABT services to a according to another embodiment of the invention.

FIG. 6 is a flow diagram of a process for providing ABT services to the customer 10 according to another embodiment of the invention.

In act 500, the call controller 1118 (for telephony calls) or iXn server 1156 (for chat, text, or non-telephony real-time interactions) detects a request for real-time interaction with the end user 1106. The interaction is routed to a resource of the contact center, and a real-time communication session is established between the end user device 1108 and a device associated with the resource. The resource may be, for example, the IMR 1122, an automated chat system (not shown), a human agent interacting with the customer via the agent device 1130, or the like.

During the interaction, the user may request ABT services for making annotations during the interaction. In this regard, the IMR 1122 may provide a prompt to select a particular key or option to invoke the ABT service.

In act 502, the ABT service module 12c receives the request for ABT service in response to the customer selecting the particular key or option. The request may be forwarded to the module 12c by the call controller 1118.

In act 504, the ABT service module 12c (or alternatively, another component of the contact center system) determines if the user has been authenticated. For example, no authentication may be needed if the user has already provided his or her credentials when interacting with the IMR 1122. If the customer has not been authenticated, an authentication process occurs in act 506. For example, the user may be authenticated by prompting and receiving an account number that the customer is trying to access, social security number, password, date of birth, home telephone number, and the like.

In act 507, it is determined if the customer is authorized for ABT services. For example, only certain customers (e.g., based on customer segment, such as "gold" customers), may be authorized for service.

If the answer is YES, the module 12c provides, in act 508, an ABT service interface for use by the customer to make annotations and/or to view data stored in the customer's user records. In this regard, the module may send to the customer a URL link to a page or application containing such an interface. For example, the link may be sent in an email or as a text message to the customer.

The customer may use the interface to generate annotations during the real-time interaction. For example, the customer may make annotations about performance of the agent in handling the interaction, customer sentiments, issues/topics that were not addressed during the interaction, reminders of topics to be discussed during the current or future call, or summary of the outcome of the interaction. The customer may also access prior annotations or other data pertaining to the user that may be stored in the mass storage device 1126 (e.g., in a CRM database).

In act 510, the annotations generated by the user are received by the ABT service module 12c and stored, for example, in the mass storage device 1126. The access to and from the mass storage device 1126 to store and retrieve annotations may be managed/coordinated by the resource module 16c.

According to one embodiment, the annotations provided by the customer are analyzed in act 512 by the ABT service module 12c, resource module 16c, or other module of the contact center. The analysis may invoke text analytics logic that uses statistical modeling, natural language processing, and/or linguistic technologies that are conventional in the art, to process and convert the unstructured free text, to meaningful data for analysis. For example, the text analytics logic may parse the annotations to identify key words or phrases.

In act 516, the ABT service module 12c identifies and takes an action that may be appropriate based on the analysis. For example, if analysis of the annotations indicates that the user is upset due to recognition of key words such as, for example, "you don't understand," "I am frustrated," "I want to talk to your supervisor," the identified next action may be to escalate handling of the interaction, to a supervisor of the contact center. In this case, the ABT service module 12c may transmit a signal/invitation to the supervisor (e.g., via the call controller 1118) during the real-time interaction, to join the interaction. In some embodiments, the next action may be scheduling a training session for the agent, and an invite may be sent to the agent for the training session. The next action may also be marking the customer's record with a flag indicating that special treatment should be given to the customer during a next interaction.

In another example, analysis of the annotations may identify a question that the customer may have forgotten to ask during the interaction. In response to identifying such a question, the ABT service module 12c may be configured to forward the question to a knowledge management server in the form of a query, and receive an automated response or knowledge article from the server that may be forwarded to the customer.

Embodiments of the present invention may also be used for providing annotations to an authentication system for conducting authentication for the customer. For example, the annotations may instruct the authentication system to take additional or different authentication steps to allow a client to access the user records.

Figure 7:
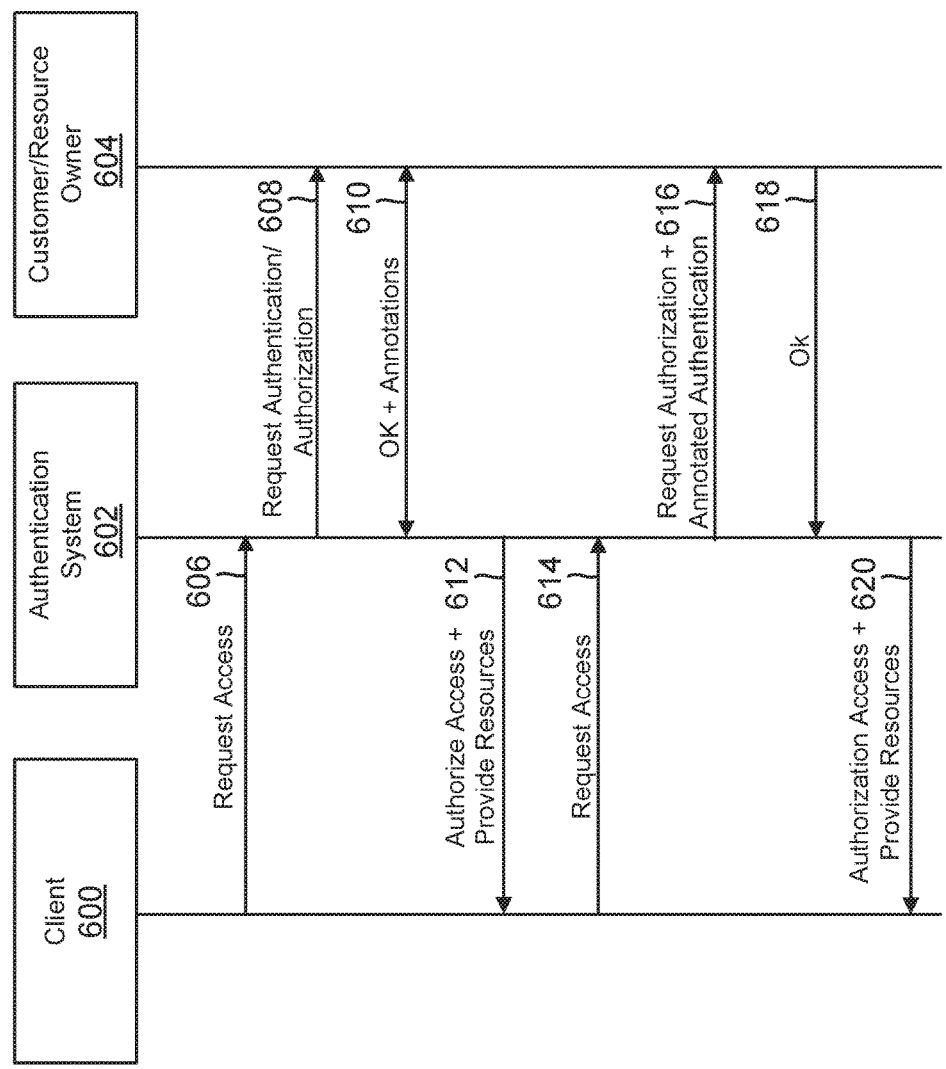
FIG. 7 is a messaging diagram for allowing authentication and authorization of users based on annotation information according to one embodiment of the invention.

FIG. 7 is a messaging diagram for allowing authentication and authorization of users based on annotation information according to one embodiment of the invention.

In act 606, a client 600 transmits, to an authentication system 602, a request to access resources of a customer 604. The resources may be files, documents, annotations, or any other electronic information that are stored on behalf of the customer. The authentication system 602 may be dedicated to the enterprise, or controlled by a third party providing authentication services to multiple enterprises. According to one embodiment, the authentication system 602 hosts a resource server and ABT service module similar to the resource server 16b and ABT service module 12b of FIG. 1B. The client 600 may be, for example, another ABT service module such as, for example, ABT service module 12a which may seek access to the resources for making annotations to the customer data.

In response to the request for access, the authentication system 602, in act 608, transmits an authorization request to the customer 604. The authorization process includes an authentication step where the customer 604 is prompted to provide a password or other secret information. The authentication of the customer 604 acts as authorization for the client 600, and a message indicative of such authorization is transmitted in act 610.

According to one embodiment, in addition to authorizing access, the customer 604 may further invoke the ABT services of the authentication system 602. The ABT services may be invoked, for example, to send annotations to the authentication system 602. According to one embodiment, the annotations are for instructing the authentication server 602 to make modifications to the authentication process the next time the client 600 requests access to the user records. For example, the annotations may be to prompt for additional security questions, password, key, or the like, from the customer 604.

In act 612, the client 600 is given authorization to access the user records, and such records are provided to the client 600 upon taking additional security measures similar to the security measures described in acts 210-216 of FIG. 2.

In act 614, the client 600 again asks for access of the user records. For example, such a request may occur after any credential received by the client 600 to access the user records, have expired.

In act 616, the authentication system 602 requests authorization from the customer 604. In addition, the authentication system 602 determines that there are annotations that have been generated by the customer, and takes further authentication steps consistent with the annotations. For example, the customer 604 is asked additional security questions per the retrieved annotations. Upon successful authentication of the customer, an authorization message is provided in act 618, In act 629, the client 600 is given authorization to access the user records, and such records are provided to the client 600 upon taking additional security measures similar to the security measures described in acts 210-216 of FIG. 2.

As a person of skill in the art should recognize, in addition to invoking the ABT services of the authentication system 602 to modify an aspect of the authentication process, the ABT services may be invoked to provide other annotations that are to be displayed or acted upon a next time the user is authenticated. For example, the annotations may simply be reminders or notes by the customer that are transmitted and displayed on a device of the customer 604 the next time the customer logs-in. For example, if the authentication system 602 is for providing access to the user's bank account, the reminder may be to transfer money between accounts, pay a particular bill, check for certain transactions, change the customer's password, or the like.

According to one embodiment, the various ABT services discussed herein may be provided separately or in conjunction with each other. For example, the invoking of the ABT services to modify an aspect of the authentication process may be provided in conjunction with ABT services for generating annotations during an interaction with a customer contact center, or for generating annotations based on review of customer data generated by a business.

In one embodiment, each of the various servers, controllers, switches, gateways, engines, and/or modules (collectively referred to as servers) in the afore-described figures are implemented via hardware or firmware (e.g., ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 8A, FIG. 8B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 8A:
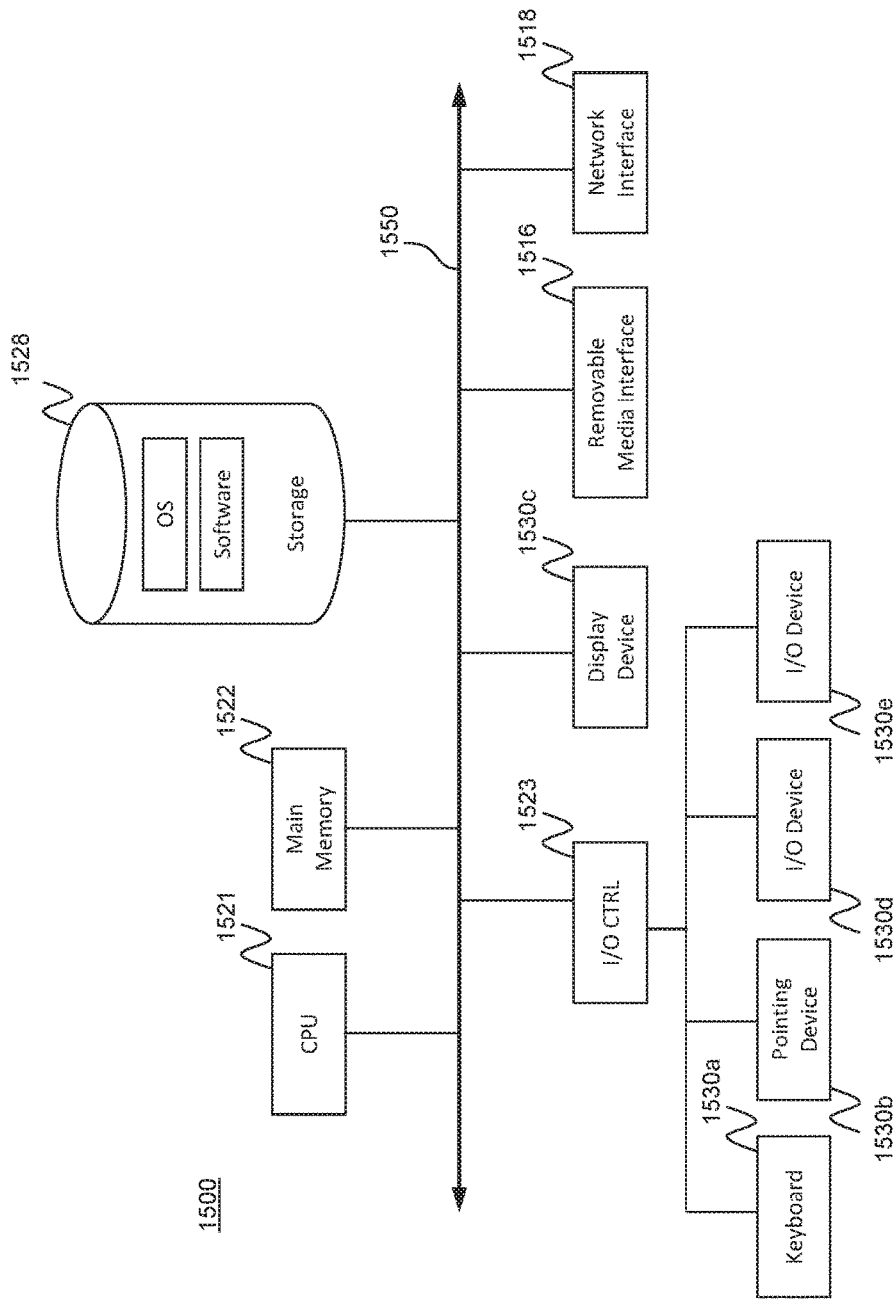
FIG. 8A is a block diagram of a computing device according to an embodiment of the present invention.
Figure 8B:
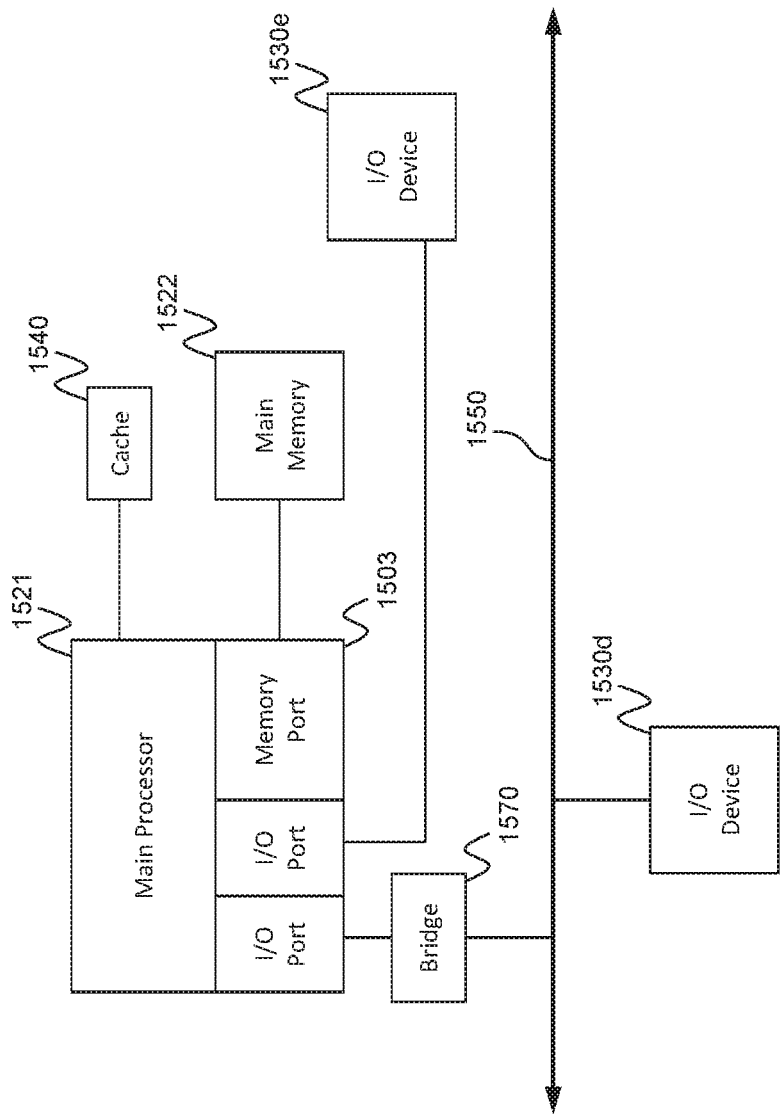
FIG. 8B is a block diagram of a computing device according to an embodiment of the present invention.

FIG. 8A and FIG. 8B depict block diagrams of a computing device 1500 as may be employed in exemplary embodiments of the present invention. Each computing device 1500 includes a central processing unit 1521 and a main memory unit 1522. As shown in FIG. 8A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 8B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 8A, the central processing unit 1521 communicates with the main memory 1522 via a system bus 1550. As shown in FIG. 8B, the central processing unit 1521 may also communicate directly with the main memory 1522 via a memory port 1503.

FIG. 8B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 8A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 8B depicts an embodiment of a computer 1500 in which the central processing unit 1521 communicates directly with I/O device 1530e. FIG. 8B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 8A, may control the I/O devices. The I/O controller may control one or more I/O devices such as a keyboard 1530a and a pointing device 1530b, e.g., a mouse or optical pen.

Referring again to FIG. 8A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530*c*, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 8A and FIG. 8B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 8D:
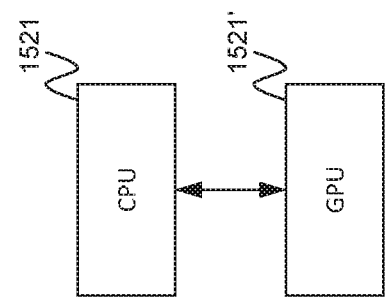
FIG. 8D is a block diagram of a computing device according to an embodiment of the present invention.
Figure 8C:
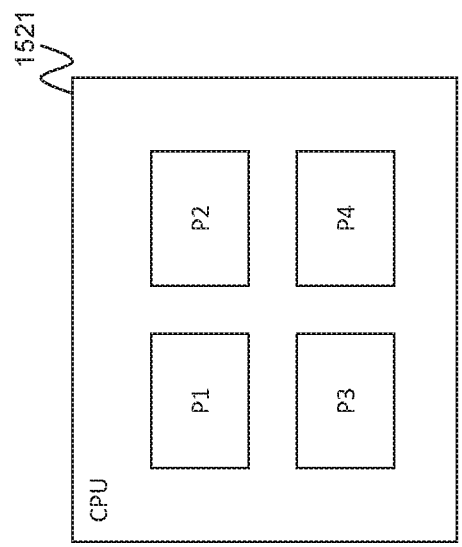
FIG. 8C is a block diagram of a computing device according to an embodiment of the present invention.

As shown in FIG. 8C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 8D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 8E:
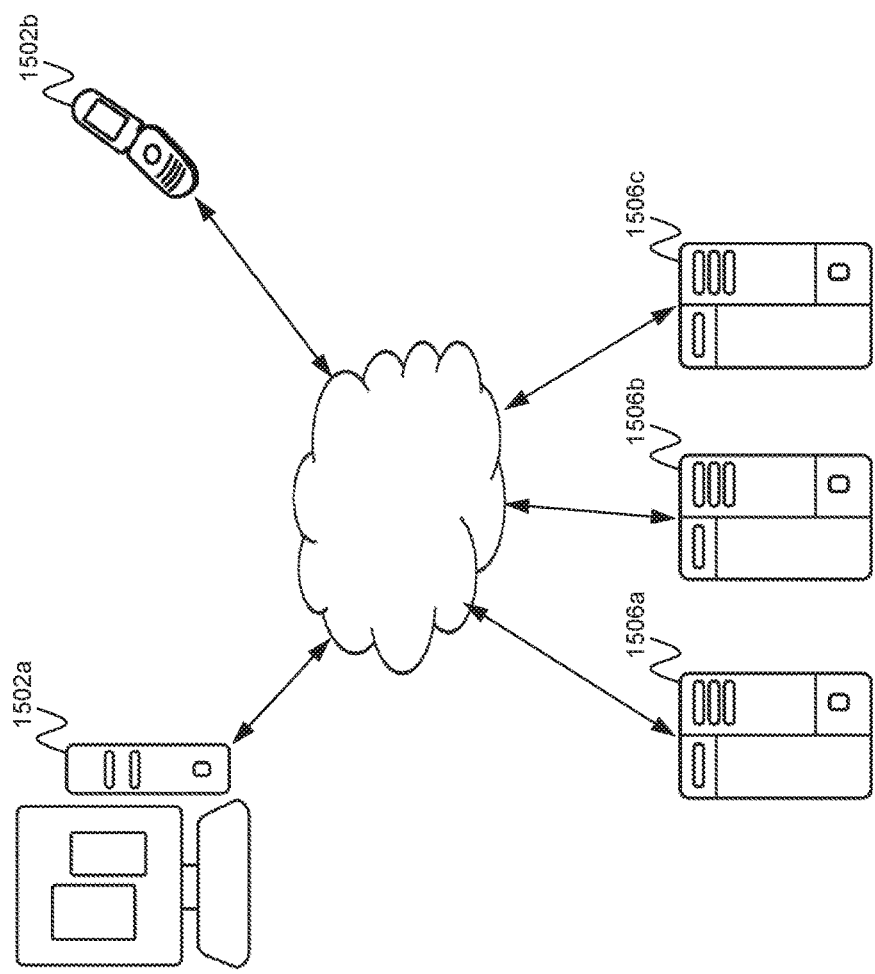
FIG. 8E is a block diagram of a network environment including several computing devices according to an embodiment of the present invention.

A computing device may be one of a plurality of machines connected by a network, or it may comprise a plurality of machines so connected. FIG. 8E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 8E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 8E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization are also contemplated, such as the network (e.g., via Software Defined Networking (SDN)). Functions, such as functions of the session border controller and other types of functions, may also be virtualized, such as via Network Functions Virtualization (NFV).

The process may be described in terms of a software routine executed by the processor in the server 100 based on instructions stored in the server's memory. The instructions may also be stored in other non-transient computer readable media such as a CD-ROM, flash drive, or the like. A person of skill in the art should also recognize that the routine may be executed via hardware, firmware (e.g., via an ASIC), or in any combination of software, firmware, and/or hardware. Furthermore, the sequence of steps of the process is not fixed, but can be altered into any desired sequence as recognized by a person of skill in the art.

What is claimed is:

1. A method for providing secure access to electronic records over a data communications network, the method comprising:
   storing in a data storage device coupled to a processor, electronic records for a first customer, the electronic records storing information about the first customer;
   receiving, by a processor, from a first client associated with the first customer, a first request to access the electronic records;
   authenticating the first client, by the processor, according to an authentication process;
   providing, by the processor, access to the information stored in the electronic records in response to determining that the first client is authenticated;
   receiving, by the processor, user input data from the first client, the user input data specifying a modified authentication process for granting access to the electronic records to a second customer, wherein the user input data specifies additional security questions for the modified authentication process;
   storing, by the processor, the user input data in the electronic records;
   receiving, by the processor, from a second client associated with the second customer, a second request to access the electronic records, wherein the second client is an application providing an interface for viewing and making modifications to the electronic records;
   in response to the second request, triggering, by the processor, the modified authentication process based on the user input data retrieved from the electronic records;
   transmitting, by the processor, an authorization request to the first client based on the triggered modified authentication process;
   authenticating, by the processor, the first client based on the modified authentication process specified by the retrieved user input data;
   in response to authenticating the first client according to the modified authentication process, transmitting, by the processor, authorization to the second client to access the information stored in the electronic records;
   transmitting, by the processor, over the data communications network, the information stored in the electronic records, to the second client, in response to the authorization of the second client;
   receiving second user input data;
   updating the electronic records based on the second user input data;
   monitoring a trigger condition associated with the second user input data; and
   transmitting a notification in response to detecting the trigger condition.

2. The method of claim 1, wherein the trigger condition is interaction with a device associated with a particular business entity.

3. The method of claim 1 further comprising:
   receiving, in response to the notification, a command to cancel a pending transaction.

4. The method of claim 2, wherein the second user input data identifies the particular business entity.

5. The method of claim 1, wherein the second user input data is a list of items.

6. The method of claim 5, wherein the trigger condition is receipt of first transaction details identifying a first item in the list of items, wherein the transmitting of the notification is in response to identifying that the first item is tagged in the list.

7. The method of claim 6 further comprising:
   receiving, in response to the notification, a command to cancel a pending transaction.

8. The method of claim 6, further comprising:
   receiving transaction details identifying a second item;
   determining whether the second item appears in the list;
   in response to determining that the second item appears in the list, determining whether the second item is tagged in the list; and
   in response to determining that the second item is untagged, tagging the second item in the list.

9. The method of claim 1, further comprising:
   identifying a real-time interaction between a customer and a first agent of a contact center, wherein the second user input data includes annotations by the customer during the real-time interaction; and
   parsing the annotations;
   wherein, the trigger condition is detection of a key word or phrase, and the notification is a notification to a second agent of the contact center.

10. The method of claim 9, wherein the notification is for escalating the handling of the interaction to the second agent.

11. The method of claim 9, wherein the notification is a message associated with training of the first agent.

12. A system for providing secure access to electronic records over a data communications network, the system comprising:
- a data storage device;
- processor coupled to the data storage device; and
- memory, wherein the memory includes instructions that, when executed by the processor, cause the processor to:
  - store in the data storage device electronic records for a first customer, the electronic records storing information about the first customer;
  - receive from a first client associated with the first customer, a first request to access the electronic records;
  - authenticate the first client according to an authentication process;
  - provide access to the information stored in the electronic records in response to determining that the first client is authenticated;
  - receive user input data from the first client, the user input data specifying a modified authentication process for granting access to the electronic records to a second customer, wherein the user input data specifies additional security questions for the modified authentication process;
  - store the user input data in the electronic records;
  - receive from a second client associated with the second customer a second request to access the electronic records, wherein the second client is an application providing an interface for viewing and making modifications to the electronic records;
  - in response to the second request, trigger the modified authentication process based on the user input data retrieved from the electronic records;
  - transmit an authorization request to the first client based on the triggered modified authentication process;
  - authenticate the first client based on the modified authentication process specified by the retrieved user input data;
  - in response to authenticating the first client according to the modified authentication process, transmit authorization to the second client to access the information stored in the electronic records;
  - transmit, over the data communications network, the information stored in the electronic records, to the second client, in response to the authorizing of the second client;
  - receive second user input data;
  - update the electronic records based on the second user input data;
  - monitor a trigger condition associated with the second user input data; and
  - transmit a notification in response to detecting the trigger condition.

13. A system for providing secure access to electronic records over a data communications network, the system comprising:
- means for storing electronic records for a first customer, the electronic records storing information about the first customer;
- means for receiving, from a first client associated with the first customer, a first request to access the electronic records;
- means for authenticating the first client, according to an authentication process;
- means for providing access to the information stored in the electronic records in response to determining that the first client is authenticated;
- means for receiving user input data from the first client, the user input data specifying a modified authentication process for granting access to the electronic records to a second customer, wherein the user input data specifies additional security questions for the modified authentication process;
- means for storing the user input data in the electronic records;
- means for receiving, from a second client, a second request to access the electronic records, wherein the second client is an application providing an interface for viewing and making modifications to the electronic records;
- in response to the second request, means for triggering the modified authentication processor based on the user input data retrieved from the electronic records;
- means for transmitting an authorization request to the first client based on the triggered modified authentication process;
- means for authenticating the first client based on the modified authentication process specified by the retrieved user input data;
- in response to authenticating the first client according to the modified authentication process, means for transmitting authorization to the second client to access the information stored in the electronic records;
- means for transmitting, over the data communications network, the information stored in the electronic records, to the second client, in response to the authorization of the second client;
- means for receiving second user input data;
- means for updating the electronic records based on the second user input data;
- means for monitoring a trigger condition associated with the second user input data; and
- means for transmitting a notification in response to detecting the trigger condition.

14. The method of claim 1, wherein the second client is the first client.

15. The system of claim 12, wherein the second client is the first client.

* * * * *